(12) United States Patent
Park et al.

(10) Patent No.: US 10,574,531 B2
(45) Date of Patent: Feb. 25, 2020

(54) METHOD FOR AUTOMATICALLY ALLOCATING IP ADDRESS FOR DISTRIBUTED STORAGE SYSTEM IN LARGE-SCALE TORUS NETWORK AND APPARATUS USING THE SAME

(71) Applicant: ELECTRONICS AND TELECOMMUNICATIONS RESEARCH INSTITUTE, Daejeon (KR)

(72) Inventors: Jeong-Sook Park, Daejeon (KR); Young-Kyun Kim, Daejeon (KR); Young-Chang Kim, Daejeon (KR); Hong-Yeon Kim, Daejeon (KR); Joon-Young Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 287 days.

(21) Appl. No.: 15/662,042

(22) Filed: Jul. 27, 2017

(65) Prior Publication Data

US 2018/0205613 A1    Jul. 19, 2018

(30) Foreign Application Priority Data

Jan. 17, 2017  (KR) .................. 10-2017-0008028

(51) Int. Cl.
*G06F 15/173*    (2006.01)
*H04L 12/24*    (2006.01)
(Continued)

(52) U.S. Cl.
CPC .......... *H04L 41/12* (2013.01); *H04L 61/2007* (2013.01); *H04L 43/0811* (2013.01); *H04L 43/0817* (2013.01); *H04L 67/1097* (2013.01)

(58) Field of Classification Search
CPC ...... G06F 11/1482; G06F 9/50; G06F 9/5038; G06F 2201/815
See application file for complete search history.

(56) References Cited

U.S. PATENT DOCUMENTS 7,639,681 B2    12/2009  Kelly et al.
7,720,026 B2 *   5/2010  Chen ................. G08G 1/161
                                                370/328
(Continued)

FOREIGN PATENT DOCUMENTS

EP              3 091 715 A1    11/2016
KR    10-2006-0057503 A          5/2006
(Continued)

*Primary Examiner* — Brian Whipple
*Assistant Examiner* — Gregory P Tolchinsky

(57) ABSTRACT

Disclosed herein are a method for automatically allocating IP addresses for a distributed storage system in a large-scale torus network and an apparatus for the method. The method for automatically allocating IP addresses includes acquiring neighboring-node information from multiple storage nodes that constitute the system; generating torus network topology for the multiple storage nodes by combining the neighboring-node information; generating IP address information through which a position of each of the multiple storage nodes in a structure corresponding to the torus network topology can be identified; and allocating IP addresses to the multiple storage nodes by delivering the IP address information to the multiple storage nodes.

15 Claims, 15 Drawing Sheets

(51) Int. Cl.
  *H04L 29/12* (2006.01)
  *H04L 29/08* (2006.01)
  *H04L 12/26* (2006.01)

(56) References Cited

U.S. PATENT DOCUMENTS

| | | | |
|---|---|---|---|
| 9,647,882 B1* | 5/2017 | Whittaker | H04L 41/08 |
| 10,169,048 B1* | 1/2019 | Allen-Ware | G06F 9/4416 |
| 2002/0122075 A1* | 9/2002 | Karasawa | G06F 3/0486 |
| | | | 715/846 |
| 2004/0083293 A1* | 4/2004 | Chen | H04L 29/12254 |
| | | | 709/227 |
| 2004/0103218 A1* | 5/2004 | Blumrich | G06F 9/52 |
| | | | 709/249 |
| 2005/0063318 A1* | 3/2005 | Xu | H04L 45/02 |
| | | | 370/254 |
| 2005/0235286 A1* | 10/2005 | Ballew | G06F 9/5038 |
| | | | 718/100 |
| 2009/0006808 A1* | 1/2009 | Blumrich | G06F 15/17337 |
| | | | 712/12 |
| 2009/0031325 A1* | 1/2009 | Archer | G06F 9/544 |
| | | | 719/315 |
| 2009/0067360 A1 | 3/2009 | Jeong et al. | |
| 2010/0316005 A1 | 12/2010 | Lee et al. | |
| 2011/0080915 A1* | 4/2011 | Baykal | H04L 12/42 |
| | | | 370/395.53 |
| 2013/0159450 A1* | 6/2013 | Faraj | G06F 15/167 |
| | | | 709/212 |
| 2014/0189094 A1* | 7/2014 | Ditya | H04L 45/245 |
| | | | 709/224 |
| 2016/0301754 A1 | 10/2016 | Lee et al. | |
| 2016/0330165 A1 | 11/2016 | Jeanne et al. | |
| 2018/0139267 A1* | 5/2018 | Choi | H04L 61/007 |

FOREIGN PATENT DOCUMENTS

| | | |
|---|---|---|
| KR | 10-2016-0121380 A | 10/2016 |
| KR | 10-2016-0131935 A | 11/2016 |

* cited by examiner

| HOST NAME | INTERFACE NAME | MAC ADDRESS | NEIGHBORING NODE HOST NAME | NEIGHBORING INTERFACE NAME | NEIGHBORING INTERFACE MAC ADDRESS |
|---|---|---|---|---|---|
| A | A_a | A_a_Mac | B | B_a | B_a_Mac |
| A | A_b | A_b_Mac | C | C_a | C_a_Mac |
| A | A_c | A_c_Mac | D | D_a | D_a_Mac |
| B | B_a | B_a_Mac | A | A_a | A_a_Mac |
| ⋮ | ⋮ | ⋮ | ⋮ | ⋮ | ⋮ |

FIG. 5

| HOST NAME | INTERFACE NAME | IP ADDRESS | NETMASK LENGTH |
|---|---|---|---|
| A | A_a | A_a_IP | NUMBER OF BITS |
| A | A_b | A_b_IP | NUMBER OF BITS |
| A | A_c | A_c_IP | NUMBER OF BITS |
| B | B_a | B_a_IP | NUMBER OF BITS |
| ⋮ | ⋮ | ⋮ | ⋮ |

1500

METHOD FOR AUTOMATICALLY ALLOCATING IP ADDRESS FOR DISTRIBUTED STORAGE SYSTEM IN LARGE-SCALE TORUS NETWORK AND APPARATUS USING THE SAME

CROSS REFERENCE TO RELATED APPLICATION

This application claims the benefit of Korean Patent Application No. 10-2017-0008028, filed Jan. 17, 2017, which is hereby incorporated by reference in its entirety into this application.

BACKGROUND OF THE INVENTION

1. Technical Field

The present invention relates generally to technology for automatically allocating IP addresses and automatically detecting network failures in order to minimize the complexity of network management in an IP-based torus network, and more particularly to technology for minimizing a management burden attributable to the allocation and management of a large number of IP addresses when a network is configured with storage devices directly connected with each other using cables, such as a torus network.

2. Description of the Related Art

Networking technology has now become generic technology for connecting all types of IT components, rather than being used only for simple connection of systems. As IT technology requires higher performance and higher capacity over time, networking techniques based on various kinds of topology are applied to system resources. As the most representative example thereof, complex topology and a routing protocol therefor are applied when a great number of CPUs is connected with the goal of improving the computational capability of a system.

Recently, with the rapid development of cloud-computing technology, storage has come to be regarded as an independent device rather than a component of a system. Accordingly, when a storage node is added and connected in scale-out storage architecture, which is a representative method for extending storage, networking techniques become critical.

These days, the amount of high-quality or atypical data continuously increases with the spread of smartphones, tablet PCs, wearable devices and the like, which raises the problem of how to increase cloud storage capacity. Also, because a huge amount of data generated from the Internet of Things (IoT), in which objects are virtualized and connected with each other, must be stored in cloud storage, it is necessary to develop high-capacity cloud storage that is efficient from the aspect of expenses.

Considering that the amount of data to be generated in 2020 is predicted to be about 44,000 EB, it is essential to develop cloud storage that is scalable to multiple exabytes of capacity. The construction of multiple petabytes of virtual cloud storage has already been reported, but the construction of multiple exabytes of cloud storage may be regarded as being beyond the capabilities of current technology. In order to provide multiple exabytes of storage, a great number of storage servers is required. Assuming that 1EB storage is constructed using techniques available in the near future, the necessary resources are estimated to be at least 1000 storage servers. Also, a FAT tree network using switches, which has generally been used for networking to date, has a limitation as to the expense and the configuration complexity for supporting high availability.

In order to overcome such a limitation as to the complexity in networking, torus or dragonfly topology is designed for a connection of CPUs, among resources of servers, and is being used for a compute-node connection network of a supercomputer, such as K Computer of Japan or Titan of Cray Inc. The advantages of this connection network may be evident when components such as storage or the like are interconnected. In connection with this, Korean Patent Application Publication No. 10-2016-0131935 (published on Nov. 16, 2016) discloses a technology related to "Method for allocating Internet protocol addresses to clients of network and apparatus corresponding thereto."

SUMMARY OF THE INVENTION

An object of the present invention is to minimize complexity when a network is constructed or managed for multiple exabytes of cloud storage.

Another object of the present invention is to efficiently operate and manage high-capacity storage by minimizing the management overhead for multiple exabytes of cloud storage.

A further object of the present invention is to automatically allocate IP addresses and to thereby configure complex network topology with the minimum amount of effort.

Yet another object of the present invention is to provide technology for reducing the burden of a system administrator by automatically allocating IP addresses without intervention on the part of the administrator even if a system is scaled to multiple exabytes.

In order to accomplish the above objects, a method for automatically allocating IP addresses for a distributed storage system in which an apparatus for automatically allocating IP addresses is used according to the present invention includes acquiring, by a management server, neighboring-node information from multiple storage nodes that constitute the system; generating, by the management server, a torus network topology for the multiple storage nodes by combining the neighboring-node information; generating, by the management server, IP address information through which a position of each of the multiple storage nodes in a structure corresponding to the torus network topology is capable of being identified; and allocating, by the management server, IP addresses to the multiple storage nodes by delivering the IP address information to the multiple storage nodes.

Here, the neighboring-node information may include at least one of a host name of a storage node, a name of an interface of the storage node, a MAC address of the interface, a host name of a neighboring node adjacent to the interface, a name of an interface of the neighboring node, and a MAC address of the interface of the neighboring node for each of the multiple storage nodes.

Here, the IP address information may include IP addresses of respective interfaces of each of the multiple storage nodes.

Here, allocating the IP addresses may be configured to allocate the IP addresses to the respective interfaces of each of the multiple storage nodes.

Here, generating the torus network topology may be configured to generate the torus network topology in such a way that, among the multiple storage nodes, a string corresponding to any one storage node is compared with a string corresponding to at least one neighboring node adjacent thereto, and the any one storage node and the at least one neighboring node are arranged depending on a result of string comparison.

Here, generating the torus network topology may include acquiring string information of each of the any one storage node and the at least one neighboring node based on the host name of the storage node.

Here, the torus network topology may have a completely symmetrical structure configured with a plane, a row and a column.

Here, a reference node may be located at an origin in a coordinate system representing the torus network topology.

Here, the IP address may include at least one of information about the plane, information about the row, information about the column, information about a direction of an interface, and information about a position of a port.

Here, the method may further include checking, by the management server, at least one of a network connection and performance for each of the multiple storage nodes using a reference node.

Here, acquiring the neighboring-node information may include requesting, by the management server, each of the multiple storage nodes to collect information about at least one neighboring node, through a reference node.

Here, each of the multiple storage nodes may explore the at least one neighboring node based on MAC communication.

Also, an apparatus for automatically allocating IP addresses for a distributed storage system according to an embodiment of the present invention includes multiple storage nodes for generating neighboring-node information by exploring at least one neighboring node based on MAC communication; and a management server for generating a torus network topology by acquiring the neighboring-node information from the multiple storage nodes, for allocating IP addresses to the multiple storage nodes by generating IP address information through which positions of the multiple storage nodes in a structure corresponding to the torus network topology are capable of being identified, and for checking at least one of a network connection and performance for each of the multiple storage nodes.

Here, the multiple storage nodes may generate the neighboring-node information by collecting at least one of a host name of a storage node, a name of an interface of the storage node, a MAC address of the interface, a host name of a neighboring node adjacent to the interface, a name of an interface of the neighboring node, and a MAC address of the interface of the neighboring node for each of the multiple storage nodes.

Here, the management server may allocate the IP addresses to the multiple storage nodes by delivering the IP address information to the multiple storage nodes.

Here, the multiple storage nodes may be assigned the IP addresses by retrieving IP addresses of respective interfaces of each of the multiple storage nodes from the IP address information, which includes the IP addresses of the respective interfaces of each of the multiple storage nodes.

Here, the management server may generate the torus network topology in such a way that, among the multiple storage nodes, a string corresponding to any one storage node is compared with a string corresponding to at least one neighboring node adjacent thereto, and the any one storage node and the at least one neighboring node are arranged depending on a result of string comparison.

Here, the torus network topology may have a completely symmetrical structure configured with a plane, a row and a column, and the IP address may include at least one of information about the plane, information about the row, information about the column, information about a direction of an interface, and information about a position of a port.

BRIEF DESCRIPTION OF THE DRAWINGS

The above and other objects, features and advantages of the present invention will be more clearly understood from the following detailed description taken in conjunction with the accompanying drawings, in which:

FIG. 5 is a view that shows an example of neighboring-node information according to the present invention;

DESCRIPTION OF THE PREFERRED EMBODIMENTS

Figure 1:
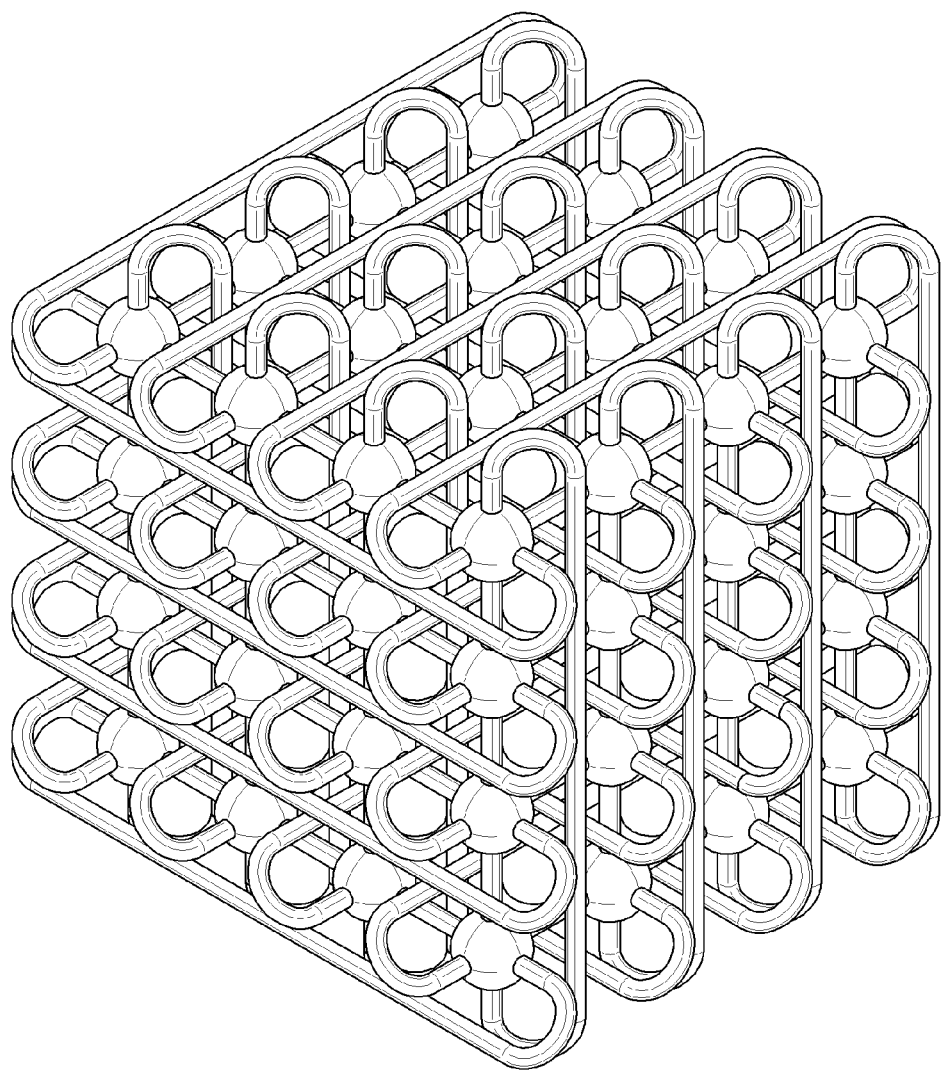
FIG. 1 is a view that shows an example of torus topology.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 3:
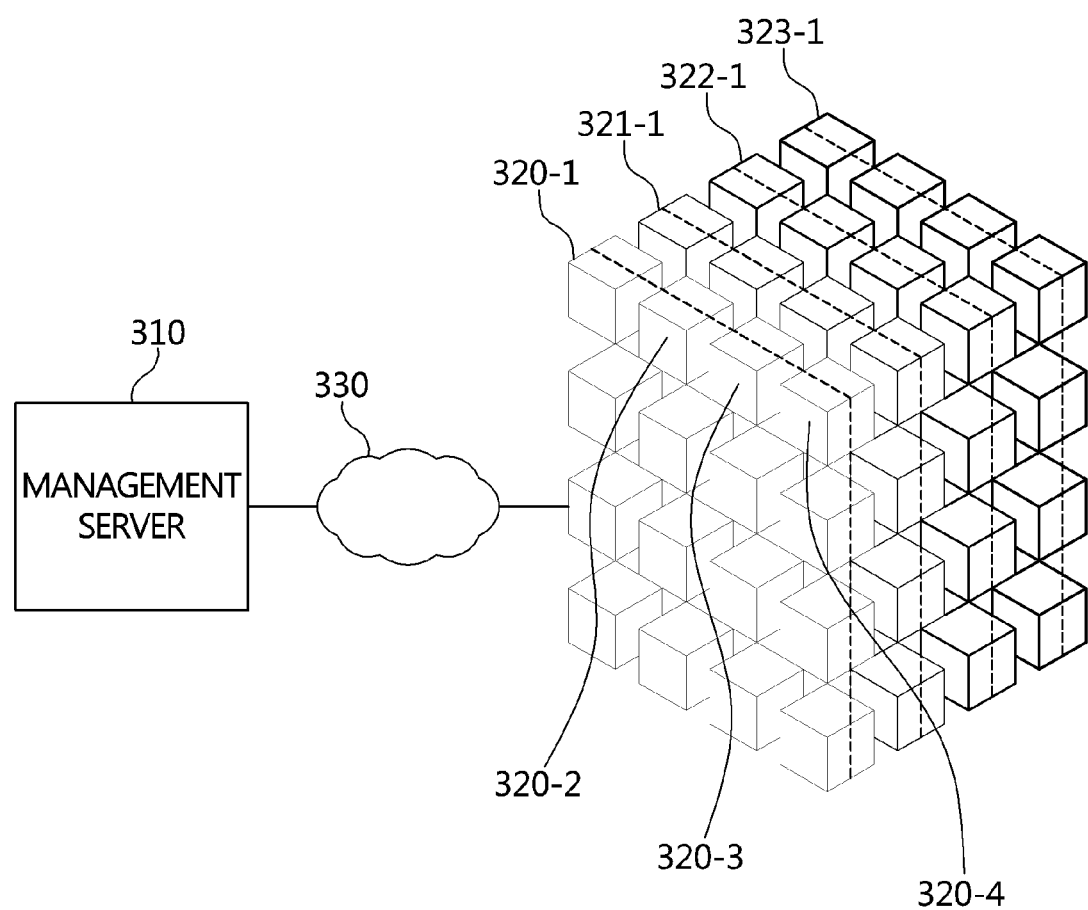
FIG. 3 is a view that shows a system for automatically allocating IP addresses according to an embodiment of the present invention.

FIG. 3 is a view that shows a system for automatically allocating IP addresses according to an embodiment of the present invention.

Referring to FIG. 3, a system for automatically allocating IP addresses according to an embodiment of the present invention is configured by connecting a management server 310 with multiple storage nodes 320-1, 320-2, 320-3, 320-4, 321-1, 322-1 and 323-1 via a 1 Gbps management network 330.

The management server 310 generates torus network topology by analyzing neighboring-node information collected by the multiple storage nodes 320-1, 320-2, 320-3, 320-4, 321-1, 322-1 and 323-1 using MAC communication. Also, the management server 310 automatically generates IP addresses for the multiple storage nodes 320-1, 320-2, 320-3, 320-4, 321-1, 322-1 and 323-1 according to some policy, allocates the generated IP addresses thereto, and enables a routing function, thereby managing the network configured with the multiple storage nodes 320-1, 320-2, 320-3, 320-4, 321-1, 322-1 and 323-1.

The multiple storage nodes 320-1, 320-2, 320-3, 320-4, 321-1, 322-1 and 323-1 locate neighboring nodes using MAC communication, and may constitute a network using IP addresses allocated by the management server 310.

Here, the multiple storage nodes 320-1, 320-2, 320-3, 320-4, 321-1, 322-1 and 323-1 may check a connection with neighboring nodes, measure a network state, and report the results to the management server 310 in response to a request therefrom. Accordingly, the management server 310 may perform a connectivity test for the entire network based on information received from the multiple storage nodes 320-1, 320-2, 320-3, 320-4, 321-1, 322-1 and 323-1.

Here, the multiple storage nodes 320-1, 320-2, 320-3, 320-4, 321-1, 322-1 and 323-1 are directly interconnected using a cable without a switch therebetween, and may thereby form a torus topology, as shown in FIG. 1.

At the outset, the multiple storage nodes 320-1, 320-2, 320-3, 320-4, 321-1, 322-1 and 323-1, which form a torus network topology, are merely connected using cables without the configuration of IP address information therefor. Therefore, for IP-based communication, it is necessary to allocate IP addresses to the multiple storage nodes.

Figure 2:
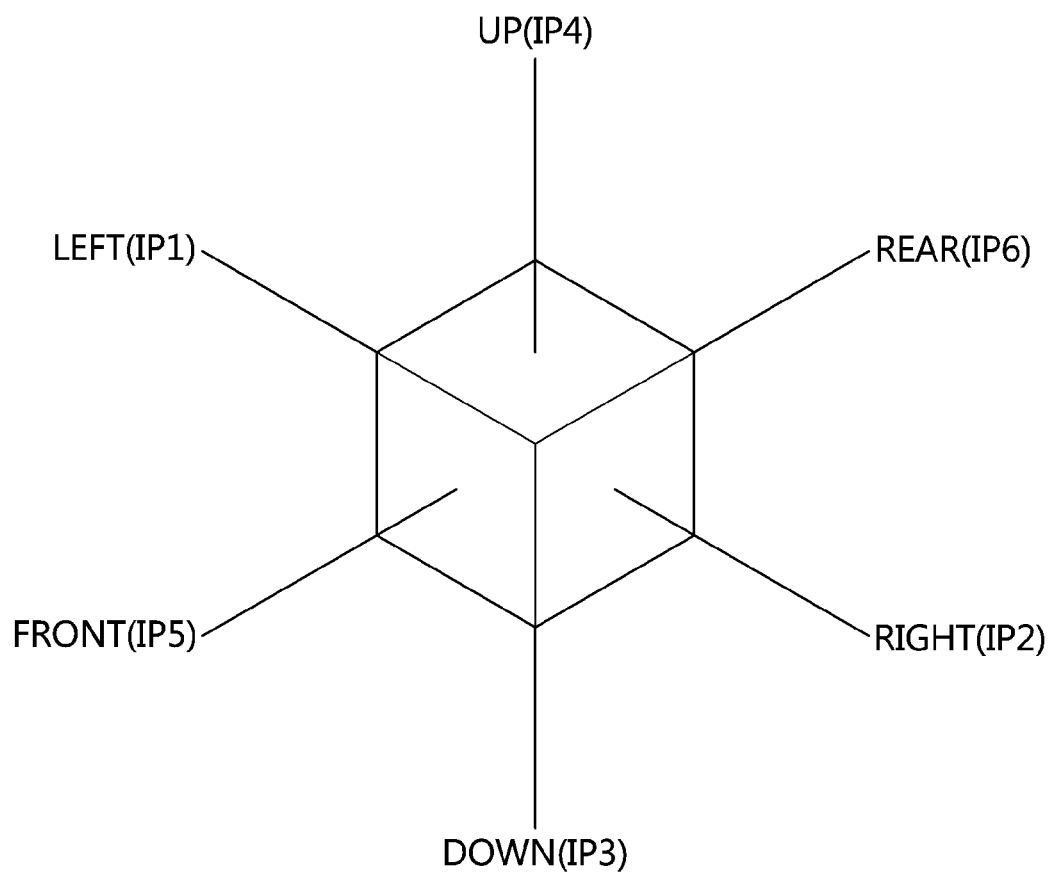
FIG. 2 is a view that shows an example of an IP address allocated in torus topology.

Here, torus network topology may be designed in a 2D or 3D form. If torus network topology is constructed in a 3D form as illustrated in FIG. 1, up to six IP addresses may be required for each node, as shown in FIG. 2. In this case, if the number of nodes is equal to or greater than 1000, the allocation of IP addresses to the nodes and other tasks subsequent thereto may become big challenges.

Accordingly, in order to minimize such a burden, the present invention proposes a method in which IP addresses are automatically allocated to multiple storage nodes 320-1, 320-2, 320-3, 320-4, 321-1, 322-1 and 323-1, which constitute torus topology, and are managed using a management server 310.

Figure 4:
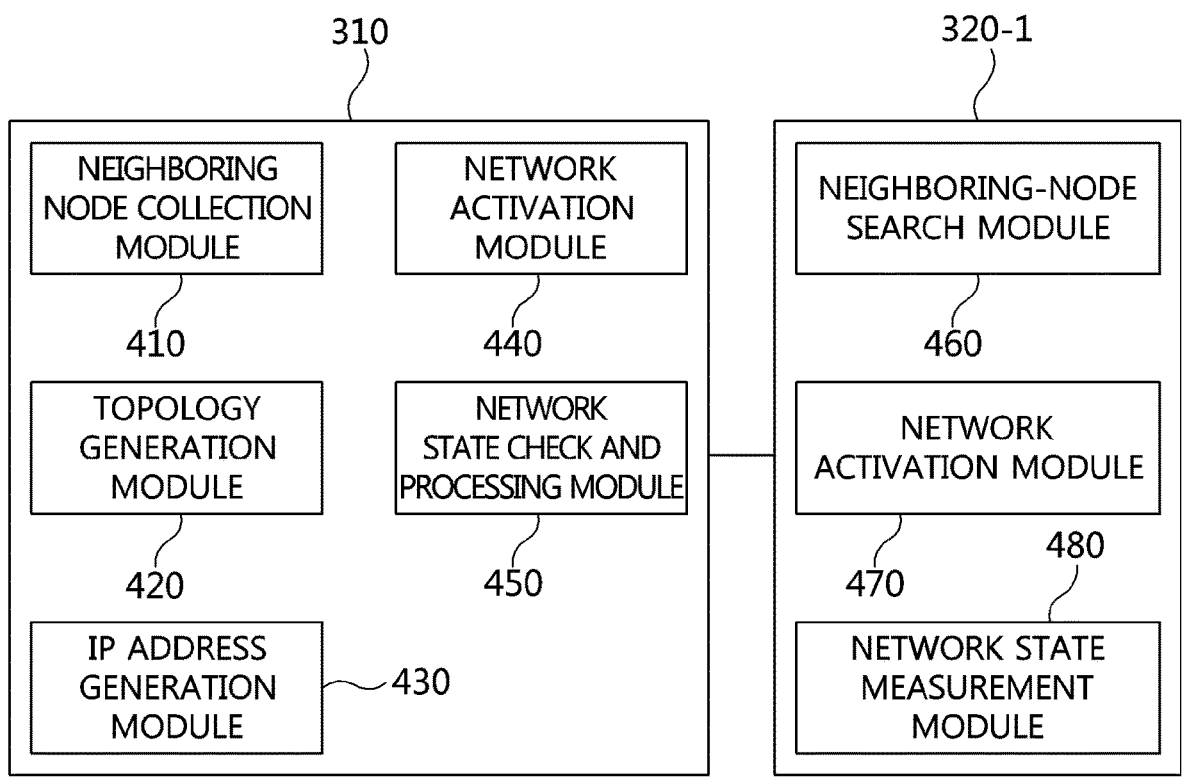
FIG. 4 is a block diagram that shows an example of the management server and the storage node, illustrated in FIG. 3.

FIG. 4 is a block diagram that shows an example of the management server and the storage node illustrated in FIG. 3.

Referring to FIG. 4, the management server 310 illustrated in FIG. 3 may be configured with a neighboring node collection module 410, a topology generation module 420, an IP address generation module 430, a network activation module 440, and a network state check and processing module 450.

The neighboring node collection module 410 may request all of the storage nodes, which are connected via a 1 Gbps management network, to collect neighboring-node information and to send the collected information to the management server.

The topology generation module 420 may generate torus network topology for the multiple storage nodes by analyzing and combining the neighboring-node information collected in response to a request from the neighboring node collection module 410. Here, information about the torus network topology may include the size of the torus structure corresponding to the entire network, information about a neighboring node adjacent to each interface of a storage node, information about the interface of the neighboring node, and the like.

The IP address generation module 430 may generate IP addresses for respective interfaces of the multiple storage nodes. Here, because the torus network topology is completely symmetrical, it is desirable to specify the position at which each of the multiple storage nodes is located in the torus topology for easier management thereof. Accordingly, IP addresses of the respective interfaces of the multiple storage nodes may be generated such that information about the position in the torus topology structure is included in the IP address.

The network activation module 440 may enable a networking function by allocating IP addresses to the respective interfaces of the multiple storage nodes. Here, the networking function may include not only a basic function of generating a configuration file for allocating IP addresses to the respective interfaces of the multiple storage nodes but also a function of generating a configuration file for routing such that the multiple storage nodes can intercommunicate without a switch therebetween.

The network state check and processing module 450 may check whether the multiple storage nodes can actually communicate when the configuration of the networking function pertaining to the multiple storage nodes is completed.

Here, the management server 310 illustrated in FIG. 4 plays an active and leading role in the process of automatically allocating IP addresses according to the present invention, but the storage node 320-1 may play a passive role, following instructions from the management server 310.

Referring to FIG. 4, the storage node 320-1, which is one of the multiple storage nodes illustrated in FIG. 3, may be configured with a neighboring-node search module 460, a network activation module 470, and a network state measurement module 480.

The neighboring-node search module 460 may acquire information about an interface adjacent to the storage node 320-1. In the state in which IP addresses have not yet been allocated to the multiple storage nodes, the neighboring-node search module 460 may search for a neighboring node based on MAC communication using a MAC address, which is the only address allocated to a Network Interface Controller (NIC) of each node.

Here, for each network interface of the storage node 320-1, the host name of a neighboring node, the name and MAC address of the interface of the neighboring node, and the like may be collected as the neighboring-node information.

The network activation module 470 may generate a configuration file for setting an IP address on each interface using IP address information delivered from the management server 310. For example, the generated configuration file may be located in the /etc/sysconfig/network-scripts directory in the Linux operating system.

Also, the network activation module 470 may generating configuration files necessary for routing of the storage node 320-1 using the IP address information. Here, all the functions necessary for routing, which can be manually checked by a system administrator, may be automatically performed using a script or an application.

The network state measurement module 480 may check whether the networking function of the storage node 320-1 is correctly configured and is operated normally in response to a request for checking a networking state from the management server 310, and may report the result of checking to the management server 310.

FIG. 5 is a view that shows an example of neighboring-node information according to the present invention.

Referring to FIG. 5, neighboring-node information according to the present invention may include information about all the interfaces of multiple storage nodes and information about a link that is adjacent to each interface by being directly connected thereto.

For example, the neighboring-node information 500 may be configured with the host name of a storage node, the name of the interface of the storage node, the MAC address of the interface, the host name of a neighboring node, the name of the interface of the neighboring node, and the MAC address of the interface of the neighboring node, as illustrated in FIG. 5.

Here, referring to the neighboring-node information 500 illustrated in FIG. 5, the interface A_a of the storage node A is located adjacent to the storage node B by being directly connected thereto. Also, the interface A_b of the storage node A is located adjacent to the storage node C, and the interface A_c of the storage node A is located adjacent to the storage node D.

In this manner, information about nodes adjacent to the respective interfaces of each of all storage nodes is searched for, whereby the neighboring-node information 500 may be generated.

Here, the neighboring-node information 500 in the form of a table is illustrated in FIG. 5 for the convenience of description, but the neighboring-node information 500 may be generated in the form of any data structure that can be used by the management server, and may then be delivered to the management server.

Here, the management server may generate torus network topology for the multiple storage nodes based on the neighboring-node information 500 illustrated in FIG. 5.

Figure 6:
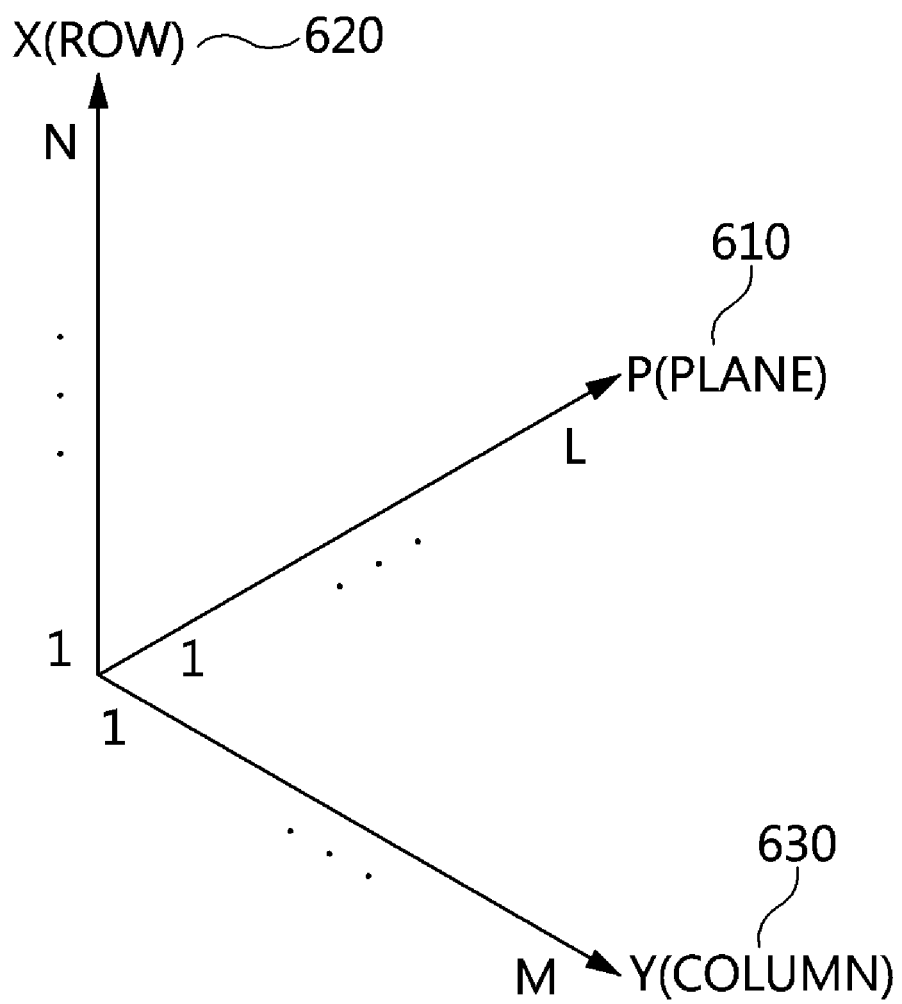
FIG. 6 is a view that shows an example of a coordinate system based on the configuration of torus network topology according to the present invention.

FIG. 6 is a view that shows an example of a coordinate system based on the configuration of torus network topology according to the present invention.

Referring to FIG. 6, the torus network topology according to the present invention may be a structure in which nodes are directly connected using cables without a switch therebetween, unlike a tree structure, in which all storage nodes are connected with a switch.

Accordingly, with an increase in the number of hops between storage nodes, corresponding to the distance therebetween, communication expense and latency time increase. Therefore, the use of information about the positions of the storage nodes in the torus structure may be an effective way to solve this problem.

To this end, the present invention may represent position information using the coordinate system illustrated in FIG. 6 in 3D torus network topology.

For example, the 3D torus structure according to the present invention may be configured with a plane (p-axis) 610, a row (x-axis) 620, and a column (y-axis) 630. That is, the coordinates of each of the storage nodes in the torus structure illustrated in FIG. 6 may be represented as (p, x, y) in the structure having the L planes 610, N rows 620, and M columns 630.

Here, because the torus network topology may be a completely symmetrical structure, it is necessary to set a reference node corresponding to a reference position in order to represent position information. Here, the coordinates of the reference node may be (0, 0, 0).

Here, the reference node may be the node that is first accessed by the management server for data access; however, a node to which a route has fewer hops may be selected as the reference node.

FIGS. 7 to 13 are views that show an example of the process of generating torus network topology according to the present invention.

Referring to FIGS. 7 to 13, the torus network topology according to the present invention has a completely symmetrical structure, and it is necessary for a system administrator to set a reference node corresponding to the origin (0, 0, 0). Here, it may be desirable for the system administrator to establish a rule about how to arrange remaining storage nodes based on the reference node.

For example, a string corresponding to the host name of a storage node may be compared with that of another storage node, and a storage node, the host name of which has a lower value as the result of string comparison, may be arranged at a rightward, lower, and rearward position relative to the position of the other storage node. Here, based on (0, 0, 0), which is the position of the reference node, nodes may be arranged in rightward, leftward, downward, upward, rearward, and frontward order depending on the result of string comparison. Because this assumption may be directly related to the rule applied when the topology is physically constructed, the order of the arrangement is not limited to this example, and may be changed according to the rule.

For example, using the above-described topology generation algorithm, a topology having a size of 10×10×10 may be generated through the following process.

Figure 7:
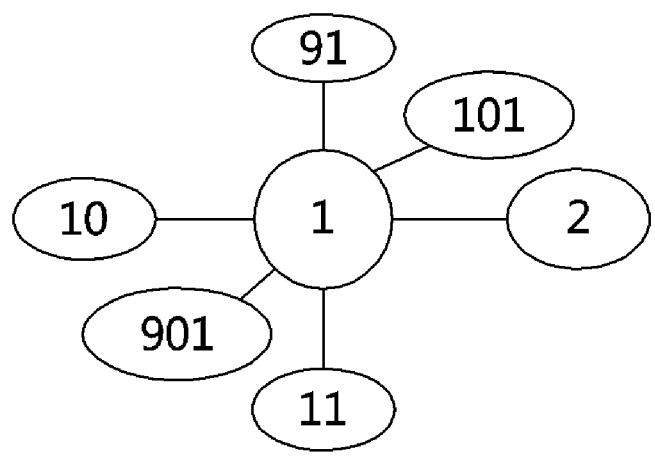
FIGS. 7 to 13 are views that show an example of the process of generating torus network topology according to the present invention.

First, node 1 illustrated in FIG. 7 is selected as a reference node that is located at the origin (0, 0, 0), and a node adjacent to each interface of node 1 is searched for and arranged according to the above-described arrangement rule. That is, based on node 1, node 2, node 10, node 11, node 91, node 101, and node 901 are found as nodes adjacent to the interfaces of node 1, and may be respectively arranged on the right side, the left side, the lower side, the upper side, the rear side, and the front side of the position of node 1.

Figure 8:
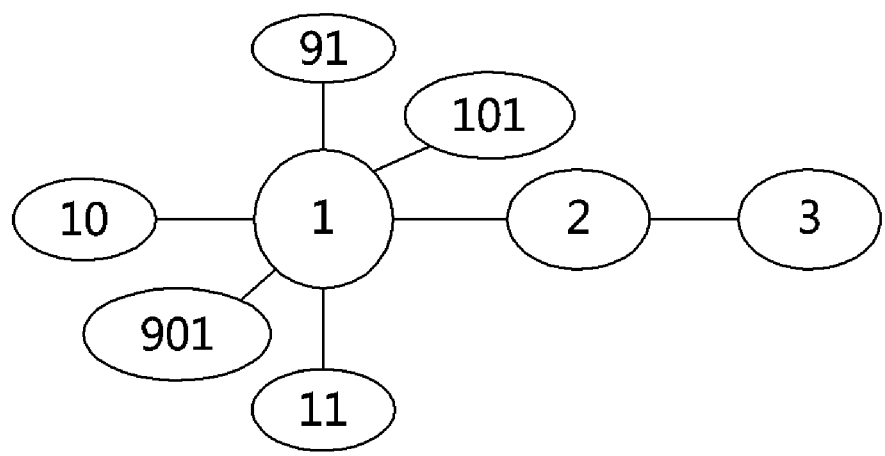
Figure 9:
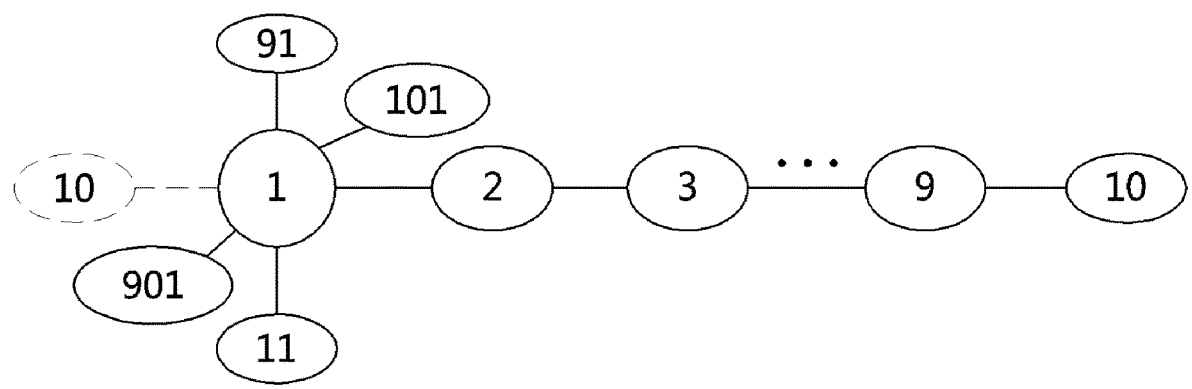

Then, as illustrated in FIG. 8 and FIG. 9, nodes in the width direction of node 1, that is, nodes located on the left or right side of node 1, are searched for and arranged. Accordingly, node 2 to node 10, which are adjacent to node 1 in the width direction, may be arranged.

Figure 10:
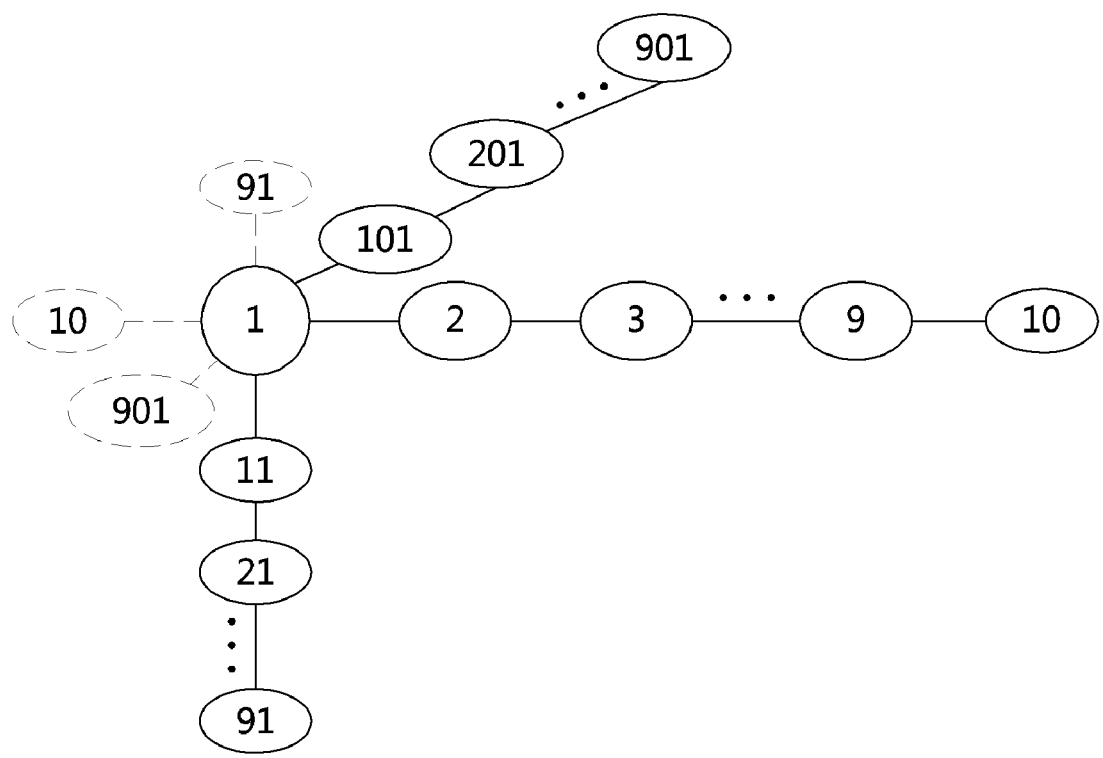

When the arrangement of nodes in the width direction of node 1 is completed as illustrated in FIG. 9, nodes adjacent to node 1 in the length direction and in the height direction may be searched for and arranged, as shown in FIG. 10.

Here, the length direction may be a direction corresponding to the front and rear sides of a node, and the height direction may be a direction corresponding to the upper and lower side of the node. That is, node 101 to node 901, adjacent to node 1 in the length direction, may be searched for and arranged.

Through the above-described arrangement process, the size of the torus network topology may be detected. That is, because the numbers of nodes arranged in the width, length, and height directions based on the reference node are all determined to be 10 through the form illustrated in FIG. 10, it is confirmed that the size of the topology is 10×10×10.

Accordingly, when nodes adjacent to the reference node in the width, length, and height directions have been arranged, all the nodes in the torus network topology may be found and arranged. That is, because the overall configuration of links has not yet been completed, remaining nodes may be continuously arranged.

Figure 11:
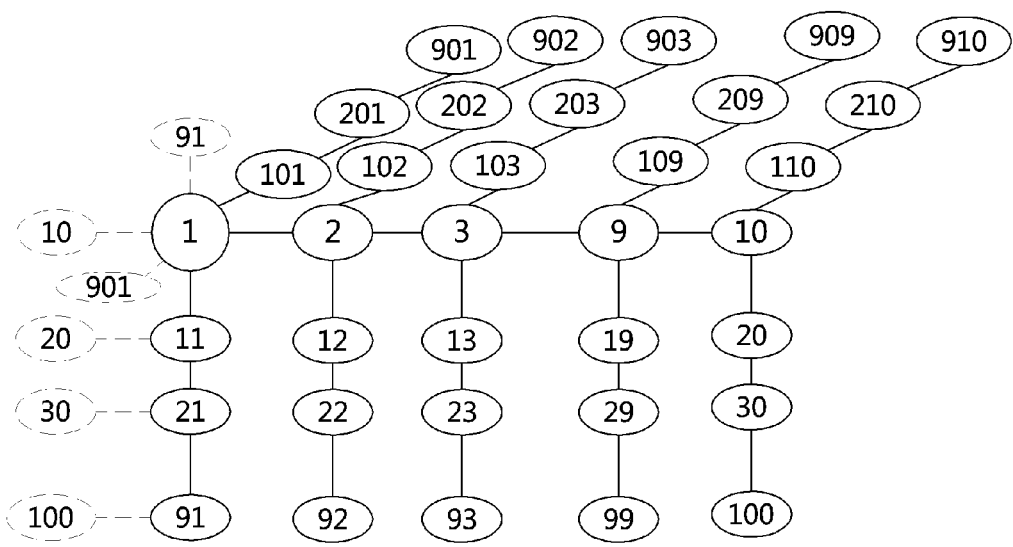

Accordingly, for each of the nodes arranged in the width direction of node 1, nodes adjacent thereto in the length and height directions may be searched for and arranged, as illustrated in FIG. 11. Here, for each node from the node arranged on the right side of node 1, nodes adjacent thereto in the length and height directions may be arranged. That is, based on node 2, neighboring node 1 on the right side thereof, nodes adjacent to node 2 in the length and height directions are searched for and arranged, and then nodes adjacent to node 3, nodes adjacent to node 4, . . . , nodes adjacent to node 10 in the length and height directions may be sequentially searched for and arranged.

Figure 12:
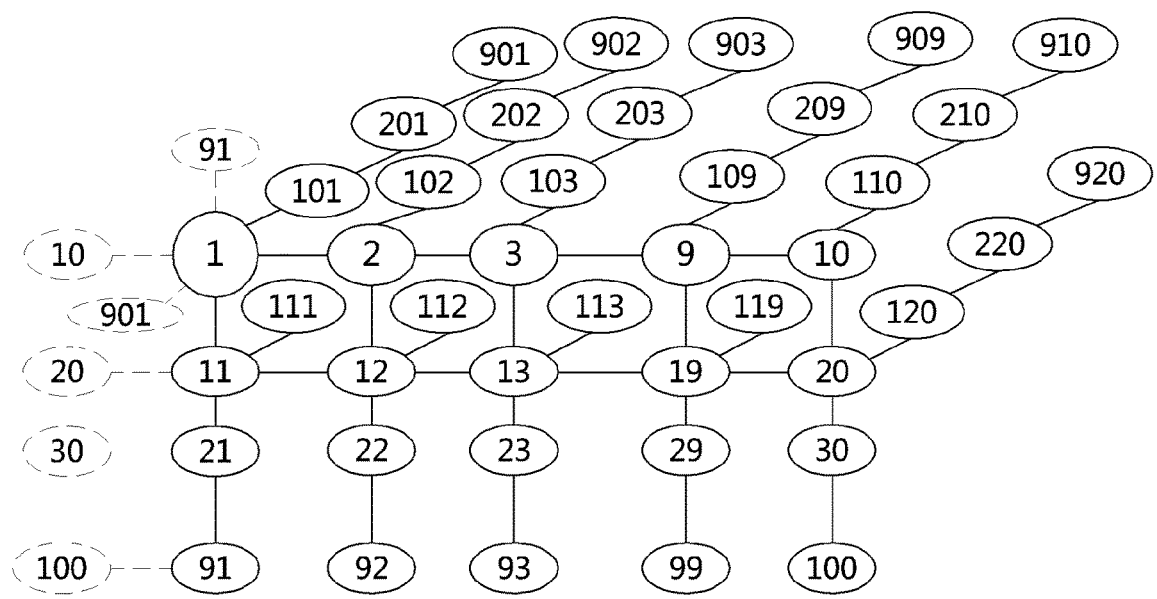

Then, as illustrated in FIG. 12, for each of the nodes arranged in the length direction of node 1, nodes adjacent thereto in the width, length, and height directions may be sequentially searched for and arranged. That is, based on node 11, neighboring node 1 on the lower side thereof, all the nodes adjacent thereto in the width, length, and height directions are searched for, and connections therebetween are made, and based on node 21 to node 91, all the nodes adjacent thereto in the width, length, and height directions may be sequentially searched for, and connections therebetween may be made.

Figure 13:
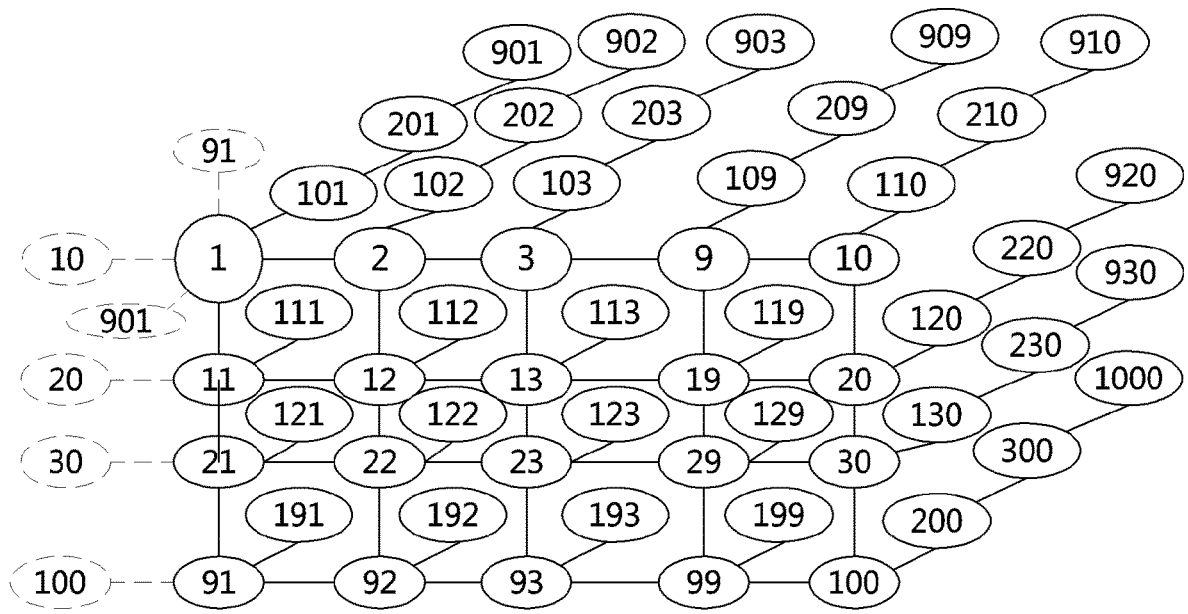

Then, as illustrated in FIG. 13, the process having been described with reference to FIGS. 7 to 12 may be performed for planes behind the plane in which node 1 is placed.

When the process described hitherto is completed, information about a complete torus network topology may be acquired.

Figures 14, 15:
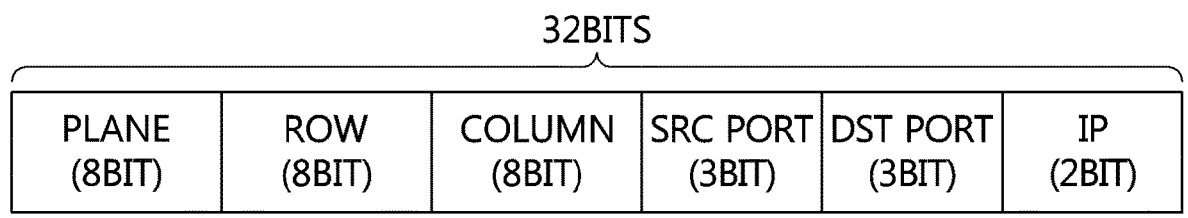
FIG. 14 is a view that shows an example of an IP address generated according to the present invention.
FIG. 15 is a view that shows an example of IP address information according to the present invention.

FIG. 14 is a view that shows an example of an IP address generated according to the present invention.

Referring to FIG. 14, the relative position of a storage node in the torus network topology may be intuitively detected using the IP address corresponding to the storage node, which is generated according to the present invention.

For example, the IP address according to the present invention may be configured such that an IPv4 address is segmented into four 8-bit fields, and the first three 8-bit fields may respectively contain information about a plane, information about a row and information about a column in the torus network topology, as shown in FIG. 14. Then, the remaining 8-bit field may be used to represent a combination of the directivity of a link and the position of a port for the storage node corresponding to the IP address.

Because an IP address is generated as described above, the respective interfaces of all the storage nodes may detect the position and the direction of a storage node using the IP address, and the management server may generate IP addresses through a simple process.

FIG. 15 is a view that shows an example of IP address information according to the present invention.

Referring to FIG. 15, IP address information 1500 according to the present invention is delivered from a management server to multiple storage nodes, and the multiple storage nodes may perform functions related to network configuration using the IP address information.

Specifically, the IP address information 1500 may be configured with the host name of a storage node, the name of the interface of the storage node, the IP address of the interface, and information about the netmask of the IP address.

Here, referring to the IP address information 1500 illustrated in FIG. 5, the interface A_a of the storage node A is assigned the IP address A_a_IP. Also, the interface A_b of the storage node A is assigned the IP address A_b_IP, and the interface B_a of the storage node B is assigned the IP address B_a_IP.

Figure 16:
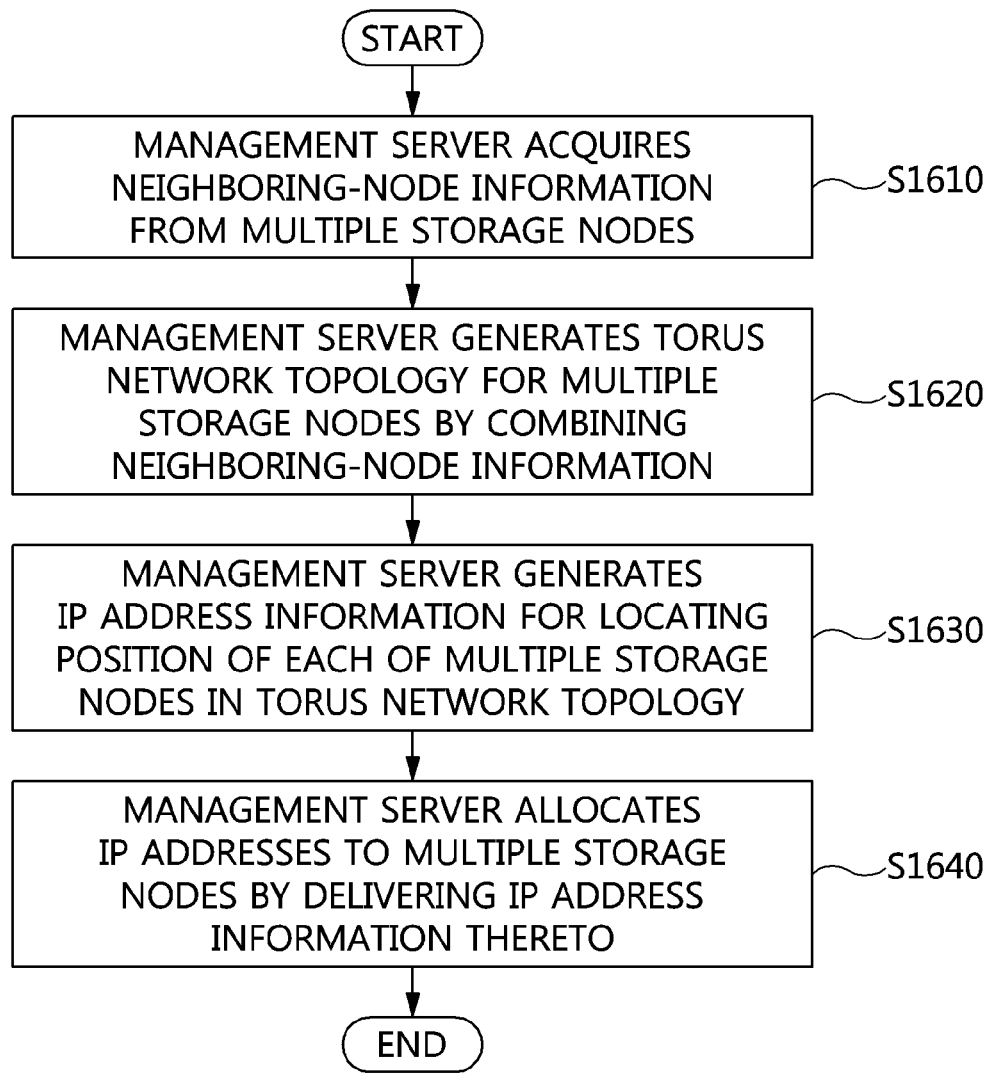
FIG. 16 is a flowchart that shows a method for automatically allocating IP addresses according to an embodiment of the present invention.

FIG. 16 is a flowchart that shows a method for automatically allocating IP addresses according to an embodiment of the present invention.

Referring to FIG. 16, in the method for automatically allocating IP addresses according to an embodiment of the present invention, a management server acquires neighboring-node information from multiple storage nodes that constitute a system at step S1610.

Here, the management server and the multiple storage nodes may communicate with each other by being connected via a 1 Gpbs management network.

Here, the neighboring-node information includes at least one of the host name of a storage node, the name of an interface of the storage node, the MAC address of the interface, the host name of a node neighboring the interface, the name of an interface of the neighboring node, and the MAC address of the interface of the neighboring node for each of the multiple neighboring nodes.

Here, the neighboring-node information may be generated by combining information about neighboring nodes collected by each of the multiple storage nodes. Therefore, the neighboring-node information may include information about neighboring nodes connected with the respective interfaces of each of the multiple storage nodes.

Here, the neighboring-node information may take the form of a data structure that the management server may make use of.

Also, although not illustrated in FIG. 16, in the method for automatically allocating IP addresses according to an embodiment of the present invention, the management server may request each of the multiple storage nodes to collect information about at least one neighboring node thereof using a reference node.

Here, because the multiple storage nodes have not been assigned IP addresses, they may collect information about neighboring nodes through MAC communication using MAC addresses and deliver the collected information.

Also, in the method for automatically allocating IP addresses according to an embodiment of the present invention, the management server generates torus network topology for the multiple storage nodes at step S1620 by combining the neighboring-node information.

Through the generated torus network topology, the size of a network configured with the multiple storage nodes, a node neighboring each interface of a storage node, information about an interface of the neighboring node, and the like may be detected.

Here, among the multiple storage nodes, a string corresponding to any one storage node is compared with a string corresponding to at least one node adjacent thereto, and the storage node and the node adjacent thereto are arranged depending on the result of the comparison, whereby a torus network topology may be generated.

For example, a string corresponding to the host name of a storage node may be compared with that of another storage node, and a storage node, the host name of which has a lower value as the result of string comparison, may be arranged at a rightward, lower, and rearward position relative to the position of the other storage node. Here, based on (0, 0, 0), which is the position of the reference node, nodes may be arranged in rightward, leftward, downward, upward, rearward, and frontward order depending on the result of string comparison. Because this assumption may be directly related to the rule that is applied when the topology is physically constructed, the order of the arrangement is not limited to this example, and may be changed according to the rule.

Here, using the host name of a storage node, included in the neighboring-node information, string information of each of any one storage node and at least one node adjacent thereto may be acquired.

Here, the torus network topology may have a completely asymmetrical structure configured with a plane, a row and a column.

Here, unlike a tree structure in which all the storage nodes are connected with a switch, the torus network topology may be a structure in which nodes are directly connected with each other using cables, without a switch therebetween.

Accordingly, with an increase in the number of hops between storage nodes, corresponding to the distance therebetween, communication expense and latency time increase. In order to solve this problem, multiple storage nodes may be efficiently arranged using coordinates based on a plane, a row and a column in a torus structure.

Here, the position of each of the multiple storage nodes may be represented as coordinates (p, x, y) based on a P-axis corresponding to a plane, an X-axis corresponding to a row, and a Y-axis corresponding to a column.

Also, in the method for automatically allocating IP addresses according to an embodiment of the present invention, the management server generates IP address information through which the position of each of the multiple storage nodes in the structure of torus network topology may be identified, at step S1630.

Here, the IP address information may include IP addresses of the respective interfaces of the multiple storage nodes.

For example, the IP address information may take the form of a data structure that can be recognized and used by the multiple storage nodes, and may include the host name of a storage node, the name of an interface of the storage node, the IP address of the interface, information about the netmask of the IP address of the interface, and the like.

Also, in the method for automatically allocating IP addresses according to an embodiment of the present invention, the management server allocates IP addresses to the multiple storage nodes by delivering the IP address information thereto at step S1640.

Here, an IP address may be allocated to each interface of each of the multiple storage nodes. Here, the management server may allocate an IP address to each interface of each of all storage nodes according to a rule set in the management server.

For example, upon receiving IP address information, each of the multiple storage nodes extracts at least one IP address from the IP address information in the form of a data structure by retrieving its host name therefrom, and allocates an IP address matching the name of each interface thereto, whereby IP addresses may be allocated to respective interfaces of all the storage nodes.

Here, a reference node may be located at the origin in the coordinate system of torus network topology.

Here, the IP address may include at least one of information about a plane, information about a row, information about a column, information about the direction of an interface, and information about the position of a port.

Accordingly, a storage node and an interface corresponding to an IP address may be intuitively detected using only the IP address.

Also, although not illustrated in FIG. 16, in the method for automatically allocating IP addresses according to an embodiment of the present invention, the management server may request the multiple storage nodes to set network configurations based on IP addresses at the time of providing IP address information thereto.

Here, the multiple storage nodes that receive the request may generate a configuration file related to networking.

Here, the multiple storage nodes may generate a configuration file related to routing for storage nodes, which must communicate with each other without a switch, as well as a configuration file for IP address information for each interface. For example, storage nodes based on Linux generate ifcfg-* files for an IP-based network and install the Quagga package or the like for the routing.

Here, when the network configuration is completed, the multiple storage nodes may enable networking and routing functions, and may then report the result thereof to the management server. For example, storage nodes based on Linux may run service commands, such as 'service network restart', 'service zebra start', 'service ospfd start', and the like.

Also, although not illustrated in FIG. 16, in the method for automatically allocating IP addresses according to an embodiment of the present invention, the management server may check at least one of a network connection state and the performance of each of the multiple storage nodes using a reference node.

Here, each of the multiple storage nodes may report the result of measuring the network state to the management server. Through this process, network connectivity and link performance may be guaranteed. Here, information measured by the multiple storage nodes is automatically analyzed by the management server without intervention on the part of an administrator, but when a failure occurs or when performance is determined to be poor, the administrator may be requested to solve the problem.

As described above, a failure must be handled by an administrator, but because the part in which the failure occurred may be automatically detected, the complexity of system management may be significantly reduced.

Also, although not illustrated in FIG. 16, in the method for automatically allocating IP addresses according to an embodiment of the present invention, various kinds of information generated in the process of automatically allocating IP addresses may be stored.

When the above-mentioned method for automatically allocating IP addresses is used, complexity in the construction or management of a network for multiple exabytes of cloud storage may be minimized, and the management overhead for the multiple exabytes of cloud storage may be minimized, whereby the high-capacity storage may be efficiently operated and managed.

Also, because IP addresses are automatically allocated, complex network topology may be configured with the minimum amount of effort.

Also, there may be provided technology that reduces the burden of a system administrator by automatically allocating IP addresses without intervention on the part of the administrator, even if a system is scaled to multiple exabytes.

Figure 17:
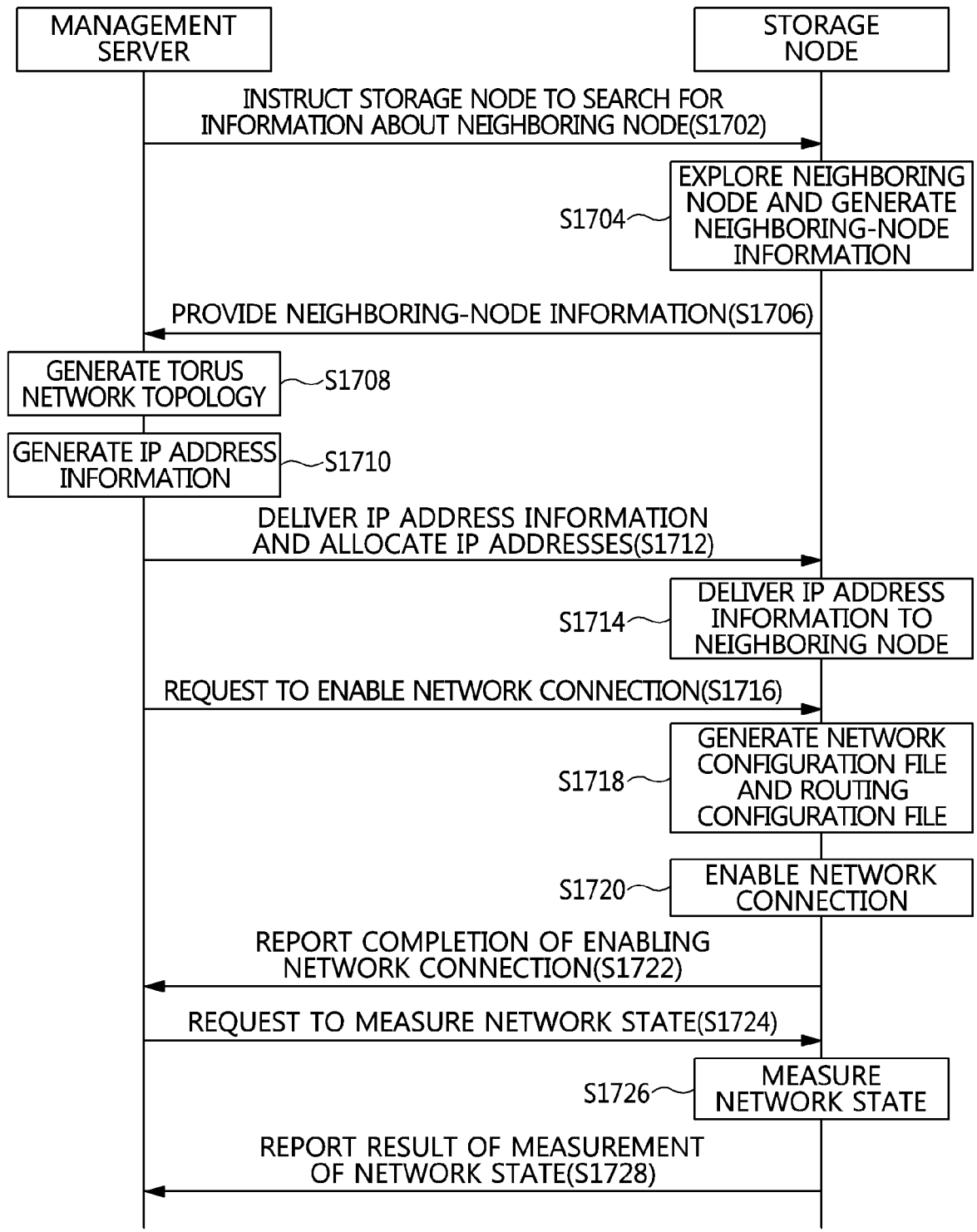
FIG. 17 is a view that shows an example of the process of automatically allocating IP addresses according to the present invention.

FIG. 17 is a view that shows an example of the process of automatically allocating IP addresses according to the present invention.

Referring to FIG. 17, in the process of automatically allocating IP addresses according to the present invention, first, a management server may instruct a storage node (multiple storage nodes or a reference node) to search for information about a neighboring node at step S1702.

Then, the storage node may generate neighboring-node information at step S1704 by exploring neighboring nodes based on MAC communication.

Then, the storage node may provide the neighboring-node information to the management server at step S1706.

Then, the management server may generate torus network topology for the storage node at step S1708 using the received neighboring-node information.

Then, the management server may generate IP address information to be used to allocate an IP address to the storage node at step S1710 by acquiring information about the position of the storage node based on the torus network topology.

Then, the management server may allocate an IP address to the storage node by delivering the IP address information thereto at step S1712.

Then, the storage node generates at least one of a network configuration file and a routing configuration file based on the allocated IP address at step S1718, and may enable a network connection using the generated configuration file at step S1720.

Then, the storage node may tell the management server that the network connection is enabled, at step S1722.

Then, the management server may request the storage node to measure a network state at step S1724, and in response thereto, the storage node may measure the network state at step S1726 and report the result to the management server at step S1728.

Depending on the result of measurement, the management server may notify an administrator of completion of automatic construction of the network when there is no problem in the network, but, when an error occurs in the network, may request that the administrator respond to the error.

Figure 18:
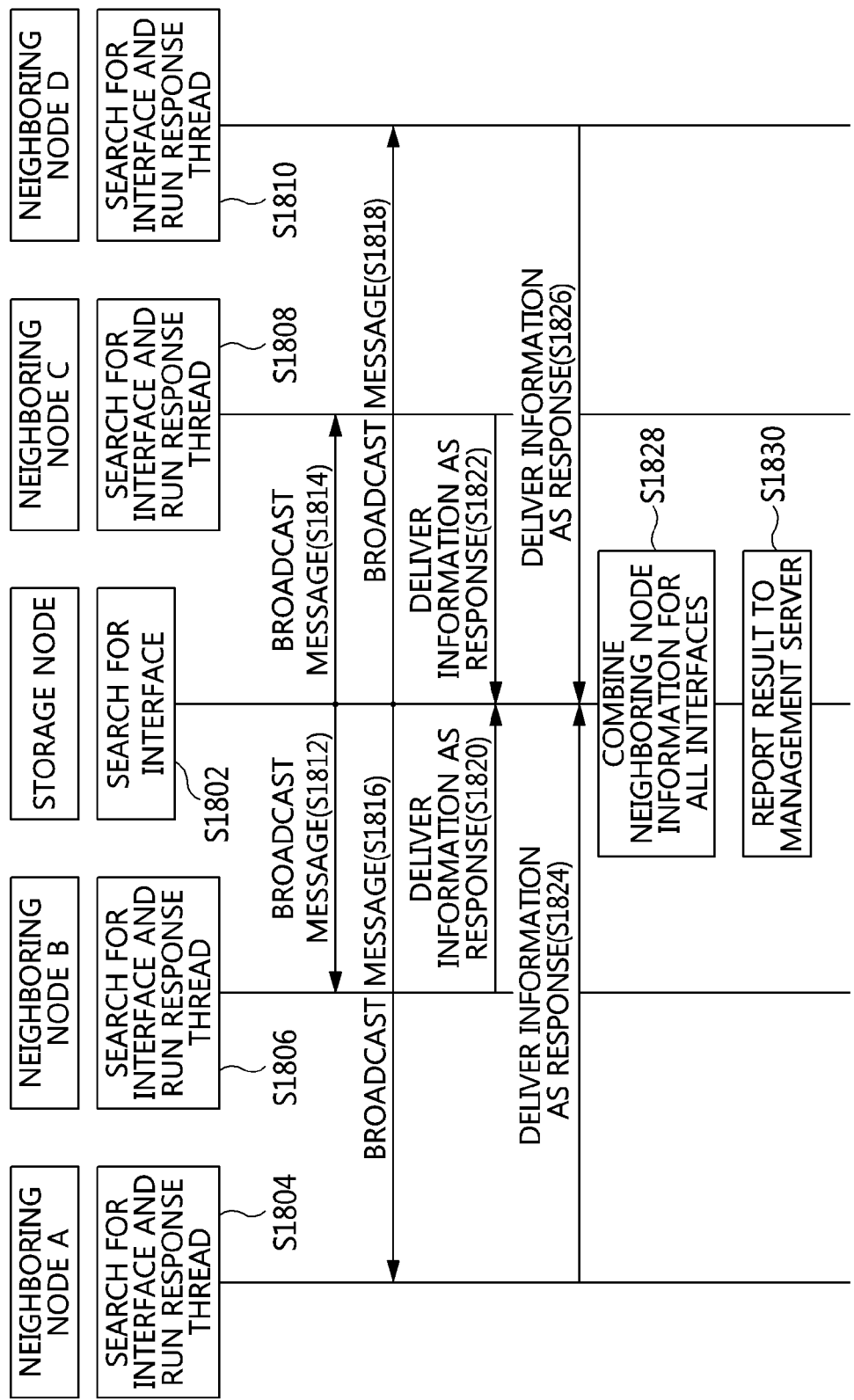
FIG. 18 is a view that shows an example of the process of generating neighboring-node information according to the present invention.

FIG. 18 is a view that shows an example of the process of generating neighboring-node information according to the present invention.

Referring to FIG. 18, in the process of generating neighboring-node information according to the present invention, a storage node that intends to explore a neighboring node may search for its interface information at step S1802.

Here, the interface information may be configured with the name and the MAC address of an interface.

Here, in order to explore a neighboring node and collect information based on MAC communication, all storage nodes are required to run an application for listening on a port. Accordingly, multiple neighboring nodes may perform the process of searching for their interfaces and running as many response threads as the number of found interfaces at steps S1804 to S1810.

Here, because the storage node illustrated in FIG. 18 is also a node neighboring another storage node, it may run a response thread at steps S1804 to S1810.

Then, the storage node broadcasts a message via all interfaces thereof based on MAC communication, whereby the message may be delivered to interfaces of neighboring nodes that are directly connected to the storage node at steps S1812 to S1818.

Here, in response to the message sent by each interface of the storage node, only a single node, which is a node adjacent to the corresponding interface, may send a response.

That is, neighboring nodes A, B, C and D, which are the nodes adjacent to the storage node, receive the message broadcasted by the storage node, and may deliver the host name thereof, the name of an interface thereof, and the MAC address of the interface as a response thereto at steps S1820 to S1826.

Then, the storage node collects information about neighboring nodes adjacent to its interfaces at step S1828, and may report the collected information to the management server at step S1830.

Figure 19:
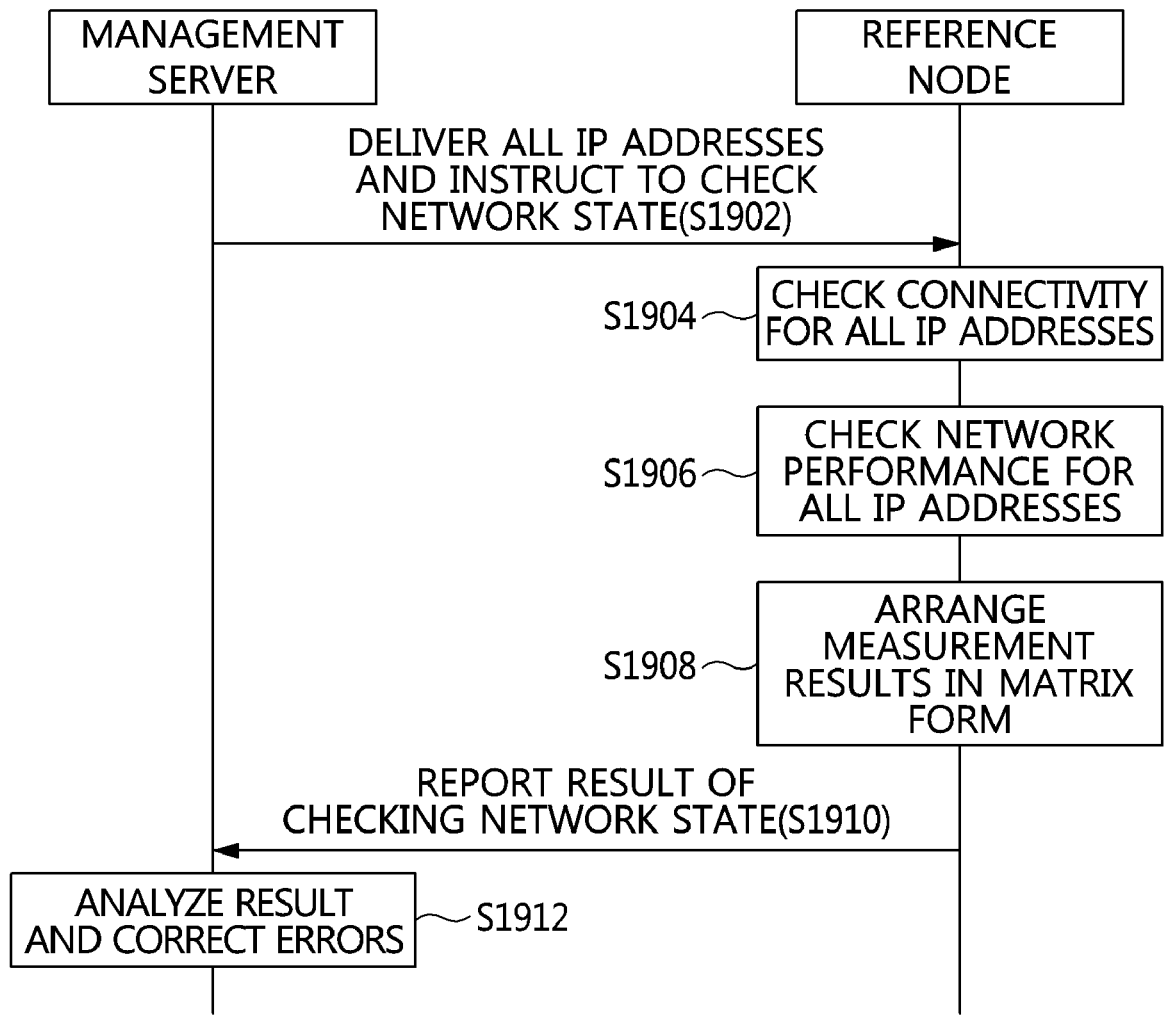
FIG. 19 is a view that shows an example of the process of checking a network state according to the present invention.

FIG. 19 is a view that shows an example of the process of checking a network state according to the present invention.

Referring to FIG. 19, in the process of checking a network state according to the present invention, first, a management server may instruct a reference node to check a network state at step S1902 by delivering all the IP addresses to the reference node.

Then, the reference node may check connectivity for all IP addresses at step S1904 using a connectivity test tool such as ping.

Also, the reference node may measure network performance for all IP addresses at step S1906 using a network performance measurement tool, such as iperf, netperf, or the like.

Then, the reference node configures the result of checking connectivity and the result of measuring network performance in a matrix form at step S1908, and may report the results to the management server at step S1910.

Then, the management server analyzes the result of checking connectivity and the result of measuring network performance, which are received from the reference node, and may correct an error at step S1912 when the location at which the error occurs is detected.

Also, although not illustrated in FIG. 19, the check and measurement process is performed again using the reference node after correcting the error, whereby the network state may be repeatedly checked until no errors are detected.

Here, when it is difficult to automatically correct an error, the error is reported to the system administrator, whereby the error may be corrected by the system administrator.

When all of the above-described processes have been completed, the networking function of a system has been completed, and the system may function as cloud storage. Also, the description in FIG. 19 may be used as a tool for periodical system checking while the system is being managed.

According to the present invention, when a network is constructed or managed for multiple exabytes of cloud storage, the complexity thereof may be minimized.

Also, the present invention may efficiently operate and manage high-capacity storage by minimizing the management overhead for multiple exabytes of cloud storage.

Also, the present invention may automatically allocate IP addresses, and may thereby configure complex network topology with the minimum amount of effort.

Also, the present invention may provide technology for reducing the burden of a system administrator by automatically allocating IP addresses without intervention on the part of the administrator even if a system is scaled to multiple exabytes.

As described above, the method and apparatus for automatically assigning IP addresses for a distributed storage system in a large-scale torus network according to the present invention are not limitedly applied to the configurations and operation of the above-described embodiments, but all or some of the embodiments may be selectively combined and configured, so that the embodiments may be modified in various ways.

What is claimed is:

1. A method for automatically allocating Internet Protocol (IP) addresses for a distributed storage system in which an apparatus for automatically allocating IP addresses is used, comprising:

acquiring, by a management server through a management network, neighboring-node information from each of a plurality of storage nodes of the system, each storage node including a plurality of interfaces, the neighboring-node information from each storage node including information about a plurality of neighboring nodes respectively directly connected to the plurality of interfaces;

generating, by the management server, a torus network topology for the plurality of storage nodes by combining the neighboring-node information;

generating, by the management server, IP address information through which a position of each of the plurality of storage nodes in a structure corresponding to the torus network topology is capable of being identified; and allocating, by the management server, respective IP addresses to the interfaces of the pluralities of interfaces of the plurality of storage nodes by delivering the IP address information to the plurality of storage nodes, wherein the management network does not use the pluralities of interfaces of the plurality of storage nodes.

2. The method of claim 1, wherein the neighboring-node information includes at least one of a host name of a storage node, a name of an interface of the storage node, a Media Access Control (MAC) address of the interface, a host name of a neighboring node adjacent to the interface, a name of an interface of the neighboring node, and a MAC address of the interface of the neighboring node for each of the plurality of storage nodes.

3. The method of claim 2, wherein generating the torus network topology is configured to generate the torus network topology in such a way that, among the plurality of storage nodes, a string corresponding to any one storage node is compared with a string corresponding to at least one neighboring node adjacent thereto, and the any one storage node and the at least one neighboring node are arranged depending on a result of string comparison.

4. The method of claim 3, wherein generating the torus network topology comprises:

acquiring string information of each of the any one storage node and the at least one neighboring node based on the host name of the storage node.

5. The method of claim 1, wherein the torus network topology has a completely symmetrical structure configured with a plane, a row and a column.

6. The method of claim 5, wherein a reference node is located at an origin in a coordinate system representing the torus network topology.

7. The method of claim 5, wherein the IP address includes at least one of information about the plane, information about the row, information about the column, information about a direction of an interface, and information about a position of a port.

8. The method of claim 1, further comprising:

checking, by the management server, at least one of a network connection and performance for each of the plurality of storage nodes using a reference node.

9. The method of claim 1, wherein acquiring the neighboring-node information comprises:

requesting, by the management server, each of the plurality of storage nodes to collect information about at least one neighboring node, through a reference node.

10. The method of claim 9, wherein each of the plurality of storage nodes explores the at least one of its respective plurality of neighboring nodes based on Media Access Control (MAC) communication.

11. An apparatus for automatically allocating IP addresses for a distributed storage system, comprising:

a plurality of storage nodes for generating neighboring-node information by each exploring at least one neighboring node of that storage node based on MAC communication, the neighboring node being directly connected to a respective one of a plurality of interfaces of that storage node;

a management network connected to each of the plurality of storage nodes; and a management server connected to the management network, the management server for generating a torus network topology by acquiring the neighboring-node information from the plurality of storage nodes through the management network, for allocating respective IP addresses to the interfaces of the pluralities of interfaces of the plurality of storage nodes by generating IP address information through which positions of the plurality of storage nodes in a structure corresponding to the torus network topology are capable of being identified, and for checking at least one of a network connection and performance for each of the plurality of storage nodes, wherein the management network does not use the pluralities of interfaces of the plurality of storage nodes.

12. The apparatus of claim 11, wherein the plurality of storage nodes generate the neighboring-node information by collecting at least one of a host name of a storage node, a name of an interface of the storage node, a MAC address of the interface, a host name of a neighboring node adjacent to the interface, a name of an interface of the neighboring node, and a MAC address of the interface of the neighboring node for each of the plurality of storage nodes.

13. The apparatus of claim 12, wherein the management server generates the torus network topology in such a way that, among the plurality of storage nodes, a string corresponding to any one storage node is compared with a string corresponding to at least one neighboring node adjacent thereto, and the any one storage node and the at least one neighboring node are arranged depending on a result of string comparison.

14. The apparatus of claim 11, wherein the management server allocates the IP addresses to the plurality of storage nodes by delivering the IP address information to the plurality of storage nodes.

15. The apparatus of claim 11, wherein the torus network topology has a completely symmetrical structure configured with a plane, a row and a column, and the IP address includes at least one of information about the plane, information about the row, information about the column, information about a direction of an interface, and information about a position of a port.

* * * * *